W. V. TURNER.
STRAIGHT AIR AND AUTOMATIC EMERGENCY BRAKE APPARATUS.
APPLICATION FILED NOV. 1, 1907.
965,615.
Patented July 26, 1910.
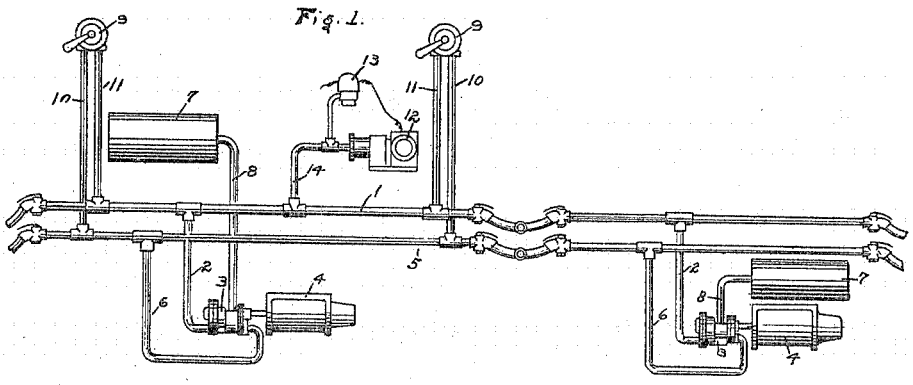
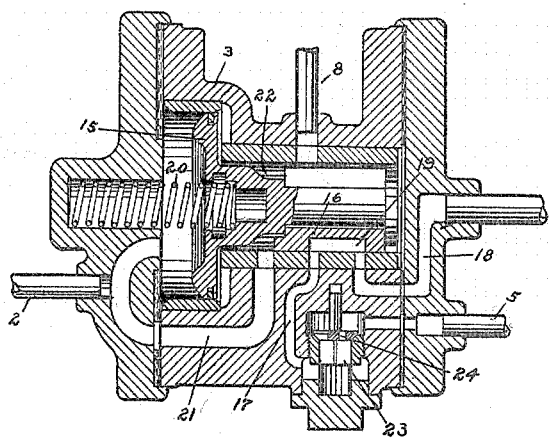
WITNESSES
INVENTOR
Walter V. Turner
by E. Wright
Att'y.

UNITED STATES PATENT OFFICE.

WALTER V. TURNER, OF EDGEWOOD, PENNSYLVANIA, ASSIGNOR TO THE WESTING-HOUSE AIR BRAKE COMPANY, OF PITTSBURG, PENNSYLVANIA, A CORPORATION OF PENNSYLVANIA.

STRAIGHT-AIR AND AUTOMATIC EMERGENCY BRAKE APPARATUS.

965,615. Specification of Letters Patent. Patented July 26, 1910.

Application filed November 1, 1907. Serial No. 400,180.

*To all whom it may concern:*

Be it known that I, WALTER V. TURNER, a citizen of the United States, residing at Edgewood, in the county of Allegheny and State of Pennsylvania, have invented new and useful Improvements in Straight-Air and Automatic Emergency Brake Apparatus, of which the following is a specification.

This invention relates to fluid pressure brake systems, and more particularly a brake system adapted for electric traction service, where two or more cars are coupled in a train. In this class of service, it has heretofore been proposed to provide a straight air brake equipment and an emergency valve mechanism for causing an emergency application of the brakes upon a sudden reduction in train pipe pressure, such as produced when a flexible hose bursts or the train breaks in two.

In order to prevent the supply or storage reservoir on the car from draining out through the open train pipe, it has further been proposed to utilize the emergency valve device to control communication between the reservoir and train pipe, so that upon movement of the emergency valve to its emergency application position, the reservoir is cut off from the train pipe. It is, however, difficult to release the brakes after an emergency application with a construction of this character, the train pipe being cut off from its source of supply.

One object of my invention, therefore, contemplates supplying air from the pump or other source of supply directly to the train pipe and controlling the communication from the train pipe to the reservoir by means of the emergency valve device, whereby the reservoir is charged from the train pipe in the normal position of the emergency valve device and is cut off in the emergency position. Thus, upon closing the emergency vent in the train pipe, the pump compresses air into the train pipe and thereby shifts the emergency valve device to release position, permitting the release of the brakes.

A desirable and simple construction of the above type of apparatus provides for supplying air from the train pipe to the straight air pipe for effecting straight air applications of the brakes, but it is liable to happen that air is supplied from the train pipe at times at such a rate as to reduce the pressure on the emergency piston, which tends to shift the same and thereby restrict or close the straight air communication to the brake cylinder.

Another object of my invention is, therefore, to provide means for limiting the flow of air through the straight air pipe to the brake cylinder, while permitting free release of fluid therefrom.

In the accompanying drawing, Figure 1 is a diagrammatic view of a fluid pressure brake equipment for a motor car and a trailer, with a preferred form of my improvements applied thereto, and Fig. 2 a central sectional view of the emergency valve device.

In Fig. 1 the apparatus on the motor car comprises train pipe 1, connected by branch pipe 2 with the emergency valve device 3, brake cylinder 4, straight air pipe 5, connected to the emergency valve device 3 by branch pipe 6, reservoir 7 connected by pipe 8 to the emergency valve device, brake valves 9, one preferably at each end of the car and connected by pipes 10 and 11 respectively to straight air pipe 5 and train pipe 1, and the trailer may be provided with a similar equipment with the exception of the brake valves.

On the motor car a fluid pressure pump is provided which may be and usually is an electric motor driven pump as 12, controlled by the usual electric pump governor 13, and connected, according to my invention, directly with the train pipe 1 by branch pipe 14.

The emergency valve device 3 comprises the usual piston 15 for controlling a slide valve 16, which normally connects the straight air passage 17, leading from the straight air pipe 5, to the brake cylinder passage 18, through a cavity 19. A spring 20 tends to maintain the piston 15 and valve 16 in the normal position, as shown in Fig. 2, in which passage 21 leading to train pipe 1, is open to the valve chamber 22, which is connected with the reservoir 7.

In operation, the pump 12 compresses air into the train pipe 1, and thence the air flows through the branch pipe 2 on each car, and passage 21 to valve chamber 22 and thence to the several reservoirs 7, charging the same to the standard pressure of the system. The brake valve 9, which may be of the ordinary straight air type, is turned to straight air application position, in order to make a straight air application of the brakes, and air flows through the brake valve from the train pipe 1 to the straight air pipe 5 and thence through passage 17 to the brake cylinder. In order to prevent the accidental movement of the piston 15 by excessive flow of air from the train pipe to the straight air pipe in the train pipe, a check valve 23 is interposed in the passage 17, opening toward the straight air pipe 5 and having a restricted port 24 therethrough, of such size as to limit the flow of air through the straight air pipe from the train pipe, such as might cause movement of the piston 15. To release the brakes, the straight air pipe 5 is connected to the atmosphere, and, as the check valve opens in this direction, a full and free exhaust is permitted.

If an emergency application of the brakes is effected by a sudden reduction in train pipe pressure, the emergency piston shifts to its extreme outer position, cutting off the passage 21, connecting the train pipe with the reservoir 7, and connecting the passage 18, leading to the brake cylinder, with the reservoir, whereby the brakes are fully applied.

While the train pipe is open to the atmosphere, whether caused by a break in two or by movement of the brake valve, the pump, being governed by the pressure in the train pipe, starts to pump air into the train pipe, and thus, upon closing the train pipe to the atmosphere, the pressure therein at once builds up to the normal pressure and moves the emergency piston 15 to release position, in which the brakes may be readily released through the straight air pipe, as before described.

It will now be apparent that I have provided a simple apparatus by which the brakes may be readily released after an emergency application of the brakes, and means for obviating the tendency of the emergency valve device to be shifted from normal position by reductions in train pipe pressure due to straight air applications of the brakes.

Having now described my invention, what I claim as new and desire to secure by Letters Patent is:—

1. In a fluid pressure brake, the combination with a train pipe, a source of fluid pressure communicating directly with the train pipe, a straight air pipe, and a brake valve for controlling the pressure in said straight air pipe, of means, normally affording communication between the straight air pipe and the brake cylinder, and operated upon a sudden reduction in train pipe pressure for supplying air to the brake cylinder.

2. In a fluid pressure brake, the combination with a train pipe, a source of fluid pressure communicating directly with the train pipe, a straight air pipe and a brake valve for controlling the pressure in said straight air pipe, of a reservoir, and means, normally affording communication between the straight air pipe and the brake cylinder, and operated upon a sudden reduction in train pipe pressure for supplying air from said reservoir to the brake cylinder.

3. In a fluid pressure brake, the combination with a train pipe, a source of fluid pressure for supplying air directly to the train pipe, a straight air pipe and a brake valve for controlling the pressure in said straight air pipe, of a reservoir, and an emergency valve device, normally affording communication between the straight air pipe and the brake cylinder and operated upon a sudden reduction in train pipe pressure for closing said straight air communication and for supplying air from said reservoir to the brake cylinder.

4. In a fluid pressure brake, the combination with a train pipe, a source of fluid pressure for supplying air directly to the train pipe, a straight air pipe and a brake valve for controlling the pressure in said straight air pipe, of a reservoir, and an emergency valve device for normally affording communication from the train pipe to the reservoir for charging the same, and from the straight air pipe to the brake cylinder, and operated upon a sudden reduction in train pipe pressure for closing said normal communications and for supplying air from said reservoir to the brake cylinder.

5. In a fluid pressure brake, the combination with a train pipe, a fluid pressure pump for supplying air directly to the train pipe, a straight air pipe, a brake valve for controlling the supply of air from the train pipe to the straight air pipe and a reservoir, of means, normally establishing a communication from the train pipe to said reservoir, and from the straight air pipe to the brake cylinder, and operated upon a sudden reduction in train pipe pressure for closing said normal communications and for supplying air from said reservoir to the brake cylinder.

6. In a fluid pressure brake, the combination with a source of fluid pressure, brake valve, straight air pipe and brake cylinder, of means for restricting the flow of air to the brake cylinder, and a check valve for permitting the free release of fluid from said brake cylinder.

7. In a fluid pressure brake, the combination with a train pipe, brake cylinder, source of fluid pressure and a straight air pipe, of a brake valve for supplying air from the train pipe to the straight air pipe and the brake cylinder, means operated upon a sudden reduction in train pipe pressure for supplying air to the brake cylinder, and means for retarding the flow of air from the train pipe through the straight air pipe to the brake cylinder.

8. In a fluid pressure brake, the combination with a train pipe, brake cylinder, source of fluid pressure and a straight air pipe, of a brake valve for supplying air from the train pipe to the straight air pipe and the brake cylinder, an emergency valve device, operated upon a sudden reduction in train pipe pressure for supplying air to the brake cylinder, means for restricting the flow of air from the train pipe through said straight air pipe to the brake cylinder, and a check valve for permitting the free release of fluid from said brake cylinder.

9. In a fluid pressure brake, the combination with a train pipe, an air pump and a reservoir to which the pump is adapted to supply air, of an automatic valve device controlling direct communication from the pump through the train pipe to the reservoir and adapted upon a reduction in train pipe pressure to supply air to the brake cylinder.

10. In a fluid pressure brake, the combination with a train pipe, a pump for compressing air directly into the train pipe, and a storage reservoir, of an automatic valve device subject to variations in train pipe pressure, for controlling communication from the train pipe to the reservoir and from the reservoir to the brake cylinder.

11. In a fluid pressure brake, the combination with a train pipe, a pump for compressing air directly into the train pipe, and a storage reservoir, of an automatic valve device subject to variations in train pipe pressure, for controlling communication from the train pipe to the reservoir and from the reservoir to the brake cylinder, and a brake valve for supplying air directly to the brake cylinder.

12. In a fluid pressure brake, the combination with a train pipe, a pump for compressing air directly into the train pipe, and a storage reservoir, of an automatic valve device subject to variations in train pipe pressure, for controlling communication from the train pipe to the reservoir and from the reservoir to the brake cylinder, a straight air pipe, and a brake valve for supplying air through said straight air pipe to the brake cylinder.

13. In a fluid pressure brake, the combination with a train pipe, a pump for compressing air directly into the train pipe, and a storage reservoir, of an automatic valve device subject to variations in train pipe pressure, for controlling communication from the train pipe to the reservoir and from the reservoir to the brake cylinder, a straight air pipe, and a brake valve for supplying air through said straight air pipe to the brake cylinder, said automatic valve device being adapted to control communication from the straight air pipe to the brake cylinder.

14. In a fluid pressure brake, the combination with a train pipe and an automatic valve device operated by a reduction in train pipe pressure for supplying air to the brake cylinder, of an air pump for compressing air directly into the train pipe.

15. In a fluid pressure brake, the combination with a train pipe, a fluid pressure pump for compressing air directly into the train pipe, and a storage reservoir for the air compressed by the pump, of a straight air pipe, a brake valve for supplying air to the brake cylinder through said straight air pipe, and an automatic valve device subject to variations in train pipe pressure for controlling communication from the train pipe to the reservoir, from the reservoir to the brake cylinder, and from the straight air pipe to the brake cylinder.

16. In a fluid pressure brake, the combination with a train pipe, a fluid pressure pump for compressing air directly into the train pipe, and a storage reservoir for the air compressed by the pump, of a straight air pipe, a brake valve for supplying air to the brake cylinder through said straight air pipe, and an automatic valve device subject to variations in train pipe pressure, and operated upon a sudden reduction in train pipe pressure to supply air from the reservoir to the brake cylinder and cut off communication from the train pipe to the reservoir and from the straight air pipe to the brake cylinder.

In testimony whereof I have hereunto set my hand.

WALTER V. TURNER.

Witnesses:
R. F. EMERY,
WM. M. CADY.